March 25, 1930. D. J. YOUNG 1,751,501
BACKRUN PROCESS OF MAKING WATER GAS
Filed Nov. 25, 1924
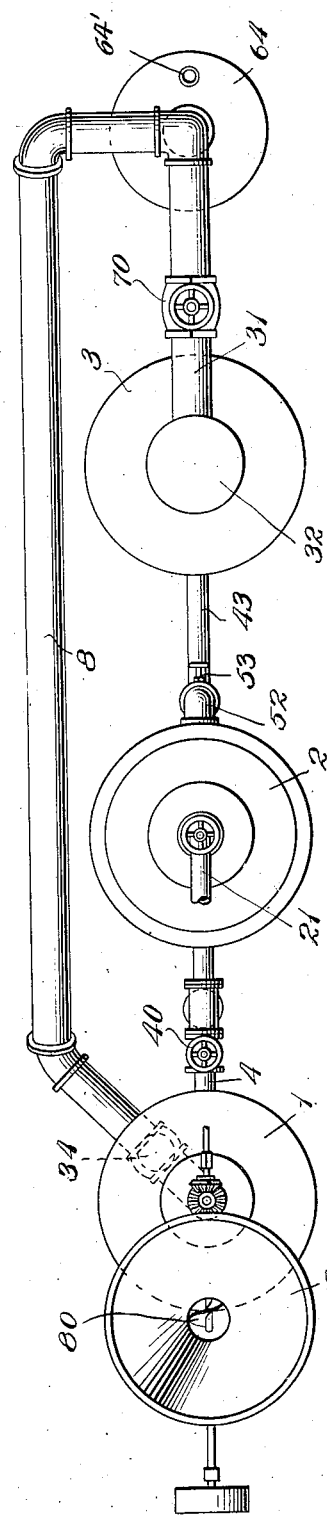
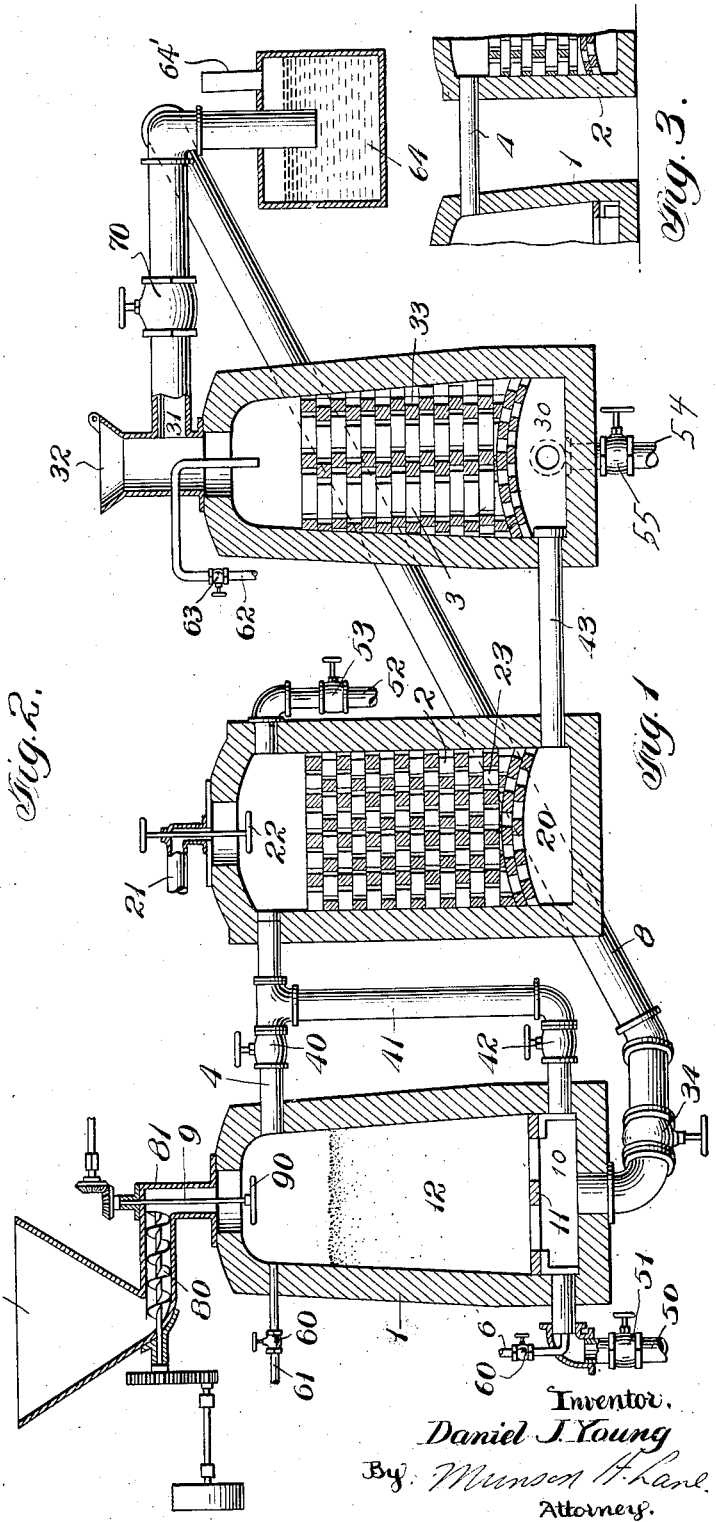
Inventor,
Daniel J. Young
By: Munson H. Lane
Attorney.

Patented Mar. 25, 1930

1,751,501

UNITED STATES PATENT OFFICE

DANIEL J. YOUNG, OF TACOMA, WASHINGTON, ASSIGNOR TO YOUNG-WHITWELL GAS PROCESS COMPANY, OF TACOMA, WASHINGTON

BACK-RUN PROCESS OF MAKING WATER GAS

Application filed November 25, 1924. Serial No. 752,104.

The invention relates to a backrun process for making water gas, which gas may be either carbureted or uncarbureted, and the process is in many ways similar to that described in my patent, No. 1,468,190, dated September 18, 1923, the principal difference in the present case being the substitution of water for steam during the backrun.

Both processes are based upon the usual water gas process and have as their primary object to make more feasible and practical the use of raw coal or other carbonaceous matter, such as lignite, now unsuited for use in that process, as the fuel for charging the generator and also to efficiently utilize the excess heat which is generated when such material is employed as the source of the fuel in the generator when operating in accordance with the customary method of operating a water gas plant.

Another object is to economically utilize a portion of the lost heat which is now wasted in water-gas operation regardless of the nature of the generator fuel.

A further object is to prevent objectionable clogging of the heat transferring parts of the apparatus, such as the carburetor and the super-heater with deposited carbon and also to periodically convert such carbon as may be deposited in such parts of the apparatus into water gas, thus eliminating the objectionable result of clogging the apparatus and at the same time converting the carbon which it deposited therein into gas.

The specific improvement which particularly distinguishes the present process from the process described and claimed in my patent, consists in the substitution of water for steam in the back run, a jet of water being introduced into the system, preferably adjacent the superheater outlet. The water comes into contact with the hot checker work in the superheater and carburetor, and is thereby converted into steam, which is passed in a reverse direction through the shells which make up the water gas set, the resulting combustible gas being taken off, preferably, at the bottom of the generator.

The process may be carried out in many different forms of apparatus but for the purpose of illustration, I have described the invention in connection with an apparatus similar to that shown in my co-pending application, Serial Number 658,393, filed August 20, 1923. The process may also be conveniently carried out in the apparatus described in the application of George E. Whitwell, Serial Number 634,811, filed April 26, 1923, as well as in other forms of apparatus.

In the drawings:—

Fig. 1 is a central vertical section of a water gas plant comprising the usual generator, carburetor and superheater, certain parts being in elevation.

Fig. 2 is a top plan view of the plant.

Fig. 3 is a fragmentary view in vertical section showing an alternative connection between the generator and carburetor.

The plant as illustrated consists of a water gas generator 1, a carburetor 2 and a superheater 3, these being of any standard or satisfactory type of construction. These are provided with the usual connections for the transfer of gas and air from one to the other. This comprises a pipe 4 connecting the upper parts of the generator and carburetor and containing therein a valve 40. A pipe 41 is also provided, connecting the pipe 4 with the lower chamber 10 of the generator beneath the grate 11. This also is provided with a valve 42. A pipe as 43 is provided connecting the chambers 20 and 30 contained at the bottom of the carburetor and superheater, respectively with each other.

The upper part of the superheater is provided with the usual gas off-take connection, as 31, and also with a stack valve, as 32, which is opened for the discharge of the gases formed during the air blasting run. The above features are substantially standard in construction for a water gas plant. The carburetor is also provided with means for introducing oil or other suitable enriching hydrocarbons at its upper end, this being represented by a pipe, as 21, and a distributer as 22, which is placed just within the chamber of the carburetor. This is, or may be, also of standard construction.

A steam pipe 6 is provided for supplying steam to the bottom of the generator and a like pipe 61 for supplying steam above the bed of the generator. Valves 60 control each of these steam pipes.

According to the present invention, the pipe 62, at the discharge end of the superheater, is used for supplying water, instead of steam as in the process covered by my Patent No. 1,468,190. Pipe 62 is controlled by valve 63. Steam pipe 61 is used in making down runs, as is common in water gas generators. At such times the gas passes to the carburetor through pipe 41. A gas off-take pipe 8 connects with the bottom of the generator, this being one of the features of my invention.

Air is supplied beneath the fuel bed of the generator for use in blasting, through pipe 50 and is controlled by valve 51. Supplemental air supply pipe 52 connects with the upper part of carburetor and is controlled by valve 53. A supplemental air pipe 54 connects with the bottom of the superheater and is controlled by valve 55.

In operating in accordance with the usual practice of a water gas plant, air would be introduced for a period beneath the grate 11 and would pass up through the fuel bed 12 during the blasting process. Supplemental air is also introduced when desired through pipes 52 to the carburetor and pipes 54 to the superheater, as may be necessary for proper combustion. This supplemental air is controlled by valves 53 and 55. This blast gas would be passed over through the pipe 4 to the carburetor, through the checkerwork 23 therein, taken through the pipe 43 to the superheater 3 and up through the checkerwork 33 therein and out through the stack valve 32.

In the gas making run the air supply from pipes 50, 54 and 52, would be discontinued and steam introduced through the pipe 6 or pipe 61 according as the run was up or down. During this run oil would be introduced through the pipe 21 and the operation would be exactly in conformity with the usual gas making run of a water gas plant.

In carrying out my process the air blasting run may be carried to a point where the checkerwork in both the carburetor and the superheater is raised to a somewhat higher temperature than would be required by the operation of the usual water gas process.

Instead of following this air blasting operation by the usual gas making run, in which steam is first passed through the fuel bed in the generator, according to my present process, I introduce water from a pipe 62 preferably at the top of the superheater. The water comes into contact with the hot checkerwork and is at once converted into steam. This steam is passed in a reverse direction to that usually employed, passing first through the superheater 3, thence through the carburetor 2, and then finally through the incandescent fuel in the generator where it is broken up, the resulting water gas being taken out at a point adjacent to where air and steam would normally be introduced to the generator, in carrying out the usual water gas process, as by pipe 8. This steam absorbs heat from the superheater, and the carburetor until it is highly superheated. When it reaches the generator it comes in contact with the coal or other fuel which is introduced thereto. This steam is sufficiently hot to volatilize some of the constituents of the coal and particularly so, if the coal be very finely reduced or powdered. The result when coal is employed as a generator fuel is the formation of a considerable amount of coal gas which is passed through the incandescent fuel and discharged through the pipe 8 leading to the wash box 64. If an up run is employed the gas off-take 8 is closed and steam admitted through the pipe 6, the steam passing upwardly through the fuel bed, thereby generating water gas, which is then passed through the carburetor and superheater to the gas off-take 31 leading to the usual wash box 64 having a gas off-take 64'. Where a down run is employed steam is admitted through pipe 61 and passes in a downward direction through the fuel bed. The gas generated thereby is taken off through the valve 42 and the upright pipe 41, passing thence through the carburetor and superheater.

Any suitable and well known means for reversing the flow of gas through the entire plant may be employed. Ordinarily this result will be accomplished by the use of the valves 34 and 70 which are placed in the pipes 8 and 31 respectively. Obviously by thus reversing the flow of gas through the plant as a whole the necessity for reversing the flow within the generator itself is avoided, and consequently the hot valve 40 of the usual gas set is rendered functionless or may be dispensed with entirely. Similarly the valve 42 and pipe 41 of the old form of a water gas plant are rendered ineffective and may be eliminated as shown in Fig. 3. It will be understood that where the improved process is applied to an old plant the valve 40 remains permanently open and the valve 42 permanently closed, there being no passage of gas through the pipe 41 and valve 42 during any phase of the operation of the plant. Likewise valve 60 in pipe 61 remains functionless during the operation of the improved process.

The steam in passing through the superheater and the carburetor comes in contact with any carbon which may have been deposited therein during the operation of the plant in the usual manner of a water gas plant. This carbon being highly heated and incandescent, combines with the steam to make water gas, thus securing two desirable results, one the utilization of this carbon for the making of gas and the other the prevention of clogging of the superheater and the carburetor with carbon and the resulting necessity of cleaning the same. The superheated steam is also further acted upon by the incandescent fuel bed of the generator to produce more water gas. The gas produced during this run of the apparatus is a combination of coal gas and water gas.

When the superheater and the carburetor have, by such a run as just described, been reduced in temperature to that which is most desirable for the operation of a water gas plant, the supply of water is cut off at 62 and the usual flow of steam, either up or down as is customary in usual water gas operation through the fuel bed in the generator, is commenced, the gas thereby formed passing on through the carburetor and superheater. During this run the supply of oil to the carburetor is commenced. When the fuel bed has been reduced in temperature to the minimum desirable temperature for gas making, this water gas making run is stopped and the air blasting run is started, after the usual manner of operating a water gas plant.

The means for introducing coal or other fuel to the generator may be varied as desired and any apparatus used which is found suitable. The apparatus illustrated consists of a hopper 18 for containing powdered coal, a screw feed 80 by which this is delivered in regular amounts to the charging pipe 81 by which it is admitted to the generator. It also includes a revolving shaft 9 to which is secured a disk 90 upon which the coal falls and from which it is discharged so as to be distributed instead of being all deposited at one point.

With the above apparatus operating in the manner described, the excess heat which has been found to be generated when coal is used for charging the generator and a portion of that heat which has hitherto been wasted regardless of the nature of the generator fuel is utilized in the superheating of the steam. This superheated steam, in turn may be used for the volatilization of the raw coal which is being charged in the generator, this forming a certain amount of coal gas which is added to the water gas.

The passage of steam through the carburetor and the superheater of the usual water gas apparatus without first passing it through the generator is an effective manner of preventing clogging of these parts with carbon, as deposited carbon would thus be converted into water gas. This is a desirable result and an improvement upon the former plan of operation which may be practiced whether or not the other steps of my process are employed.

Obviously during the backrun, if no oil is being admitted to the carburetor, uncarbureted water gas is produced, and during this period the carburetor and superheater function merely as heat regenerators, and may be referred to respectively, as the primary heat interchanger and the secondary heat interchanger.

Accordingly, where the specification or claims refer to "water" gas or to "combustible" gas, the term is intended to be used generically to include both uncarbureted or "blue" water gas and carbureted water gas.

In the accompanying drawings, the water from which the back run steam is generated is shown as introduced at the top of the superheater. This location of the pipe 62 is preferable, but, if desired, water may be introduced into the system at other points, as, for example, at the bottom of the superheater or at the bottom of the carburetor.

The invention may also be carried out in a manner similar to that described in the application of George E. Whitwell, Serial Number 634,811. This could be readily accomplished by providing a means between the pipes 8 and 31 whereby a portion of the gas taken off from the bottom of the generator may be recirculated together with steam, through the plant as a whole.

Obviously other changes within the scope of the invention will suggest themselves to one skilled in the art, the foregoing description being for the purpose of illustration only, the invention being limited only by the appended claims.

I claim:—

1. The improvement in the process of making carbureted water gas, which when carried out in a plant comprising a single water gas generator having a solid fuel bed, a single carburetor, and a single superheater, connected in series in constant and uniform relation, with a permanently free passage therebetween, consists in introducing water into the superheater containing highly heated checkerwork, whereby steam is produced, passing said steam successively through the superheater, carburetor, and the fuel bed in the generator, and withdrawing water gas from the bottom of the generator.

2. The improvement in the process of making carbureted water gas, which when carried out in a plant comprising a single water gas generator having a solid fuel bed, a single carbureter, and a single superheater, consists in introducing water into the highly heated superheater, whereby steam is produced, passing said steam successively through the superheater, carburetor, and the fuel bed in the generator, and withdrawing water gas from the generator.

3. The improvement in the usual two cycle process of making water gas, carried out in a set comprising a single water gas generator having a solid fuel bed, a single primary heat interchanger, and a single secondary heat interchanger, the single units being located in separate and detached shells, one cycle comprising air blasting the fuel bed of the generator and storing the resulting heat successively in the primary and secondary heat interchangers, the other cycle consisting in making a forward steam run successively through the generator, primary heat interchanger and the secondary heat interchanger, and withdrawing the resulting water gas directly from the secondary heat interchanger; the improvement which comprises making a third cycle in which water is introduced into the heated set whereby steam is produced, passing the said steam through the fuel bed of the generator, and withdrawing the resulting water gas directly from the generator for storage or use.

4. The improvement in the process of making carbureted water gas, which, when carried out in an apparatus comprising a single generator having a bed of solid fuel, a single carburetor, and a single superheater, which apparatus has been heated in a previous air blasting operation, comprises introducing water into the heated apparatus and thereby converting the same into steam, passing said steam downwardly through the fuel bed of the generator, and withdrawing the resulting water gas directly from the generator.

In testimony whereof I affix my signature.

DANIEL J. YOUNG.